United States Patent
Dixon et al.

(10) Patent No.: US 11,880,320 B1
(45) Date of Patent: Jan. 23, 2024

(54) COMMON-MODE SIGNALING AND COUPLER BYPASS IN LEGACY BUSSES

(71) Applicant: Peraton Labs Inc., Basking Ridge, NJ (US)

(72) Inventors: James Dixon, Basking Ridge, NJ (US); Thomas Banwell, Basking Ridge, NJ (US); Seth Robertson, Basking Ridge, NJ (US); Frederick Porter, Basking Ridge, NJ (US)

(73) Assignee: PERATON LABS INC., Basking Ridge, NJ (US)

( * ) Notice: Subject to any disclaimer, the term of this patent is extended or adjusted under 35 U.S.C. 154(b) by 0 days.

(21) Appl. No.: 17/351,890

(22) Filed: Jun. 18, 2021

(51) Int. Cl.
 *G06F 13/36* (2006.01)

(52) U.S. Cl.
 CPC .......... *G06F 13/36* (2013.01); *G06F 2213/40* (2013.01)

(58) Field of Classification Search
 None
 See application file for complete search history.

(56) References Cited

U.S. PATENT DOCUMENTS

| | | | | |
|---|---|---|---|---|
| 6,052,420 A | * | 4/2000 | Yeap | H04B 15/00 375/258 |
| 6,522,699 B1 | * | 2/2003 | Anderson | H04L 25/03057 375/295 |
| 6,658,051 B1 | * | 12/2003 | Liu | H04L 12/66 379/93.05 |
| 8,587,159 B2 | * | 11/2013 | Torres Canton | H04L 25/0272 307/147 |
| 10,158,343 B1 | * | 12/2018 | Keane | H03K 17/92 |
| 2010/0322296 A1 | * | 12/2010 | Lam | H04L 25/022 375/222 |
| 2021/0239776 A1 | * | 8/2021 | Walter, III | G01R 15/181 |

* cited by examiner

*Primary Examiner* — Elias Mamo
(74) *Attorney, Agent, or Firm* — Heslin Rothenberg Farley & Mesiti PC; Rachel L. Pearlman, Esq.

(57) ABSTRACT

A system and method of adding a high-rate channel to a legacy baseband bus includes a bus communicatively coupled to a transmitter and a receiver via one or more transformer couplers, where the transmitter and receiver transmit and receive a first signal over the bus utilizing a differential mode. The system also includes at least two modems coupled to the bus, where a first modem transmits a second signal over the bus for receipt by a second modem, where the at least two modems are each coupled to the bus via the one or more transformer couplers, where the second signal is transmitted over the bus utilizing a common mode, and where the first signal and the second signal are spatially separated on the bus based on an isolation between the common mode and the differential mode.

20 Claims, 10 Drawing Sheets

US 11,880,320 B1

COMMON-MODE SIGNALING AND COUPLER BYPASS IN LEGACY BUSSES

GOVERNMENT RIGHTS STATEMENT

This invention was made with U.S. Government support under project number 32015 awarded by the Air Force Research Laboratory of the U.S. Air Force Material Command. The government has certain rights in the invention.

BACKGROUND OF INVENTION

A legacy technology is one that has been superseded by a newer, superior technology, but cannot be replaced because of its widespread use. A number of data bus technologies have become legacy technologies over the years because they have found massive popularity and in many cases are installed in platforms where replacement isn't feasible. However, these legacy buses lack the sophistication of the newer technologies, and often only support lower data rates. Some research has more recently been focused on the promise of adding a second, higher rate data channel onto the legacy bus in such a way that the legacy functionality is unaffected. However, transmitting two signals simultaneously on a legacy bus presents many technological challenges. An example of a legacy bus which presents various technological limitations, is a MIL-STD-1553 legacy data bus.

SUMMARY OF INVENTION

Shortcomings of the prior art are overcome and additional advantages are provided through the provision of a system for adding an additional channel to a legacy bus. The system includes: a bus communicatively coupled to a transmitter and a receiver via one or more transformer couplers, wherein the transmitter and receiver transmit and receive a first signal, wherein the first signal is transmitted over the bus utilizing a differential mode; and at least two modems, wherein a first modem of the at least two modems is coupled to a first location on the bus and wherein a second modem of the at least two modems is coupled to a second location on the bus, wherein the modems transmit a second signal over the bus for receipt by the second modem, wherein the at least two modems are coupled to the bus via the one or more transformer couplers, wherein the second signal is transmitted over the bus utilizing a common mode, and wherein the first signal and the second signal are spatially separated on the bus based on an isolation between the common mode and the differential mode.

Shortcomings of the prior art are also overcome and additional advantages are provided through the provision of a method for adding an additional channel to a legacy bus. The method includes: spatially separating a first signal from a second signal for transmission over a bus, the spatially separating comprising: utilizing a transmitter and receiver pair to transmit a first signal over a bus in a differential mode, wherein the bus is communicatively coupled to the transmitter and to the receiver via one or more transformer couplers; and utilizing at least two modems to transmit a second signal over the bus in a common mode, wherein the bus is communicatively coupled to the one or more modems via the one or more transformer couplers.

Shortcomings of the prior art are also overcome and additional advantages are provided through the provision of a computer program product for adding an additional channel to a legacy bus. The computer program product includes a computer readable storage medium readable by one or more processors and storing instructions for execution by the one or more processors for performing a method comprising: spatially separating, by the one or more processors, a first signal from a second signal for transmission over a bus, the spatially separating comprising: utilizing a transmitter and receiver pair to transmit a first signal over a bus in a differential mode, wherein the bus is communicatively coupled to the transmitter and to the receiver via one or more transformer couplers; and utilizing at least two modems to transmit a second signal over the bus in a common mode, wherein the bus is communicatively coupled to the one or more modems via the one or more transformer couplers.

Systems, computer program products, and methods relating to one or more aspects of the technique are also described and may be claimed herein. Further, services relating to one or more aspects of the technique are also described and may be claimed herein.

Additional features are realized through the techniques of the present invention. Other embodiments and aspects of the invention are described in detail herein and are considered a part of the claimed invention.

BRIEF DESCRIPTION OF DRAWINGS

One or more aspects of the present invention are particularly pointed out and distinctly claimed as examples in the claims at the conclusion of the specification. The foregoing and objects, features, and advantages of one or more aspects of the invention are apparent from the following detailed description taken in conjunction with the accompanying drawing.

DETAILED DESCRIPTION OF THE INVENTION

Figure 1:
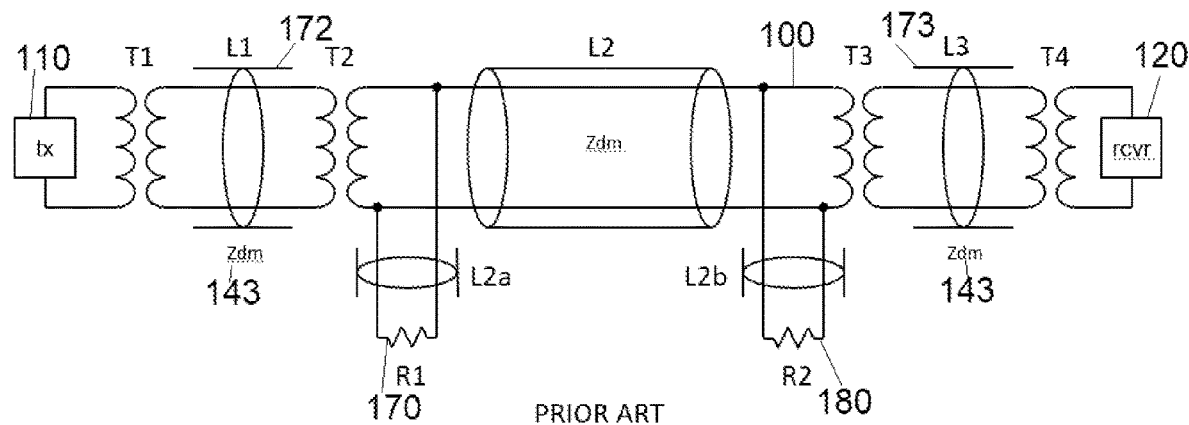
FIG. 1 depicts a legacy bus.

Aspects of the present invention and certain features, advantages, and details thereof, are explained more fully below with reference to the non-limiting examples illustrated in the accompanying drawings. Descriptions of well-known materials, fabrication tools, processing techniques, etc., are omitted so as not to unnecessarily obscure the invention in detail. It should be understood, however, that the detailed description and the specific examples, while indicating aspects of the invention, are given by way of illustration only, and not by way of limitation. Various substitutions, modifications, additions, and/or arrangements, within the spirit and/or scope of the underlying inventive concepts will be apparent to those skilled in the art from this disclosure. The terms software and program code are used interchangeably throughout this application and can refer to logic executed by both hardware and software. Components of the system that can be utilized to execute aspects of embodiments of the present invention may include specialized hardware, including but not limited to, a GPP, an FPGA and a GPU (graphics professor unit). Additionally, items denoted as processors may include hardware and/or software processors or other processing means, including but not limited to a software defined radio and/or custom hardware.

The terms "connect," "connected," "contact" "coupled" and/or the like are broadly defined herein to encompass a variety of divergent arrangements and assembly techniques. These arrangements and techniques include, but are not limited to (1) the direct joining of one component and another component with no intervening components therebetween (i.e., the components are in direct physical contact); and (2) the joining of one component and another component with one or more components therebetween, provided that the one component being "connected to" or "contacting" or "coupled to" the other component is somehow in operative communication (e.g., electrically, fluidly, physically, optically, etc.) with the other component (notwithstanding the presence of one or more additional components therebetween). It is to be understood that some components that are in direct physical contact with one another may or may not be in electrical contact and/or fluid contact with one another. Moreover, two components that are electrically connected, electrically coupled, optically connected, optically coupled, fluidly connected or fluidly coupled may or may not be in direct physical contact, and one or more other components may be positioned therebetween.

The terms "including" and "comprising", as used herein, mean the same thing.

The terms "substantially", "approximately", "about", "relatively", or other such similar terms that may be used throughout this disclosure, including the claims, are used to describe and account for small fluctuations, such as due to variations in processing, from a reference or parameter. Such small fluctuations include a zero fluctuation from the reference or parameter as well. For example, they can refer to less than or equal to ±10%, such as less than or equal to ±5%, such as less than or equal to ±2%, such as less than or equal to ±1%, such as less than or equal to ±0.5%, such as less than or equal to ±0.2%, such as less than or equal to ±0.1%, such as less than or equal to ±0.05%. If used herein, the terms "substantially", "approximately", "about", "relatively," or other such similar terms may also refer to no fluctuations, that is, ±0%.

As used herein, "electrically coupled" and "optically coupled" refers to a transfer of electrical energy and light waves, respectively, between any combination of a power source, an electrode, a conductive portion of a substrate, a droplet, a conductive trace, wire, waveguide, nanostructures, other circuit segment and the like. The terms electrically coupled and optically coupled may be utilized in connection with direct or indirect connections and may pass through various intermediaries, such as a fluid intermediary, an air gap and the like.

Embodiments of the present invention include a system and method of adding a high-rate channel to a legacy baseband bus that can use transformer couplers to access the bus. In some examples, aspects of the present invention simplify circuits used by a high-rate data channel to share the bus with a legacy baseband signal. In embodiments of the present invention, the signals sent over the legacy bus can be closer in frequency than in existing approaches to adding another channel to a legacy bus because of the signal isolation provided by utilizing different modes. Thus, the signals are spatially separated on the bus based on an orthogonality between the common mode and the differential mode Aspects discussed herein enable the use of legacy baseband buses with this added channel with at least the following advantages over existing technologies: 1) isolation of signals using normal differential mode for one channel and common mode propagation for the new channel; 2) circumvention of the high-pass, high-loss common mode response of a coupler by the introduction of a bypass circuit. Regarding the first advantage, in embodiments of the present invention, both the differential mode and the common mode are supported by triaxial shielded twisted pair (STP) cables. One non-limiting example of a bus upon which aspects of embodiments of the present invention can be implemented is a MIL-STD-1553 data bus. Before discussing aspects of the various examples herein, the possible components of a legacy bus will be discussed and illustrated in FIG. 1, and then the details and drawbacks of an existing approach will be discussed and illustrated in FIGS. 2-3.

Known technological approaches which add functionality to carry multiple signals on an existing bus are limited by the legacy infrastructure and various existing limitations of those approaches. However, as will be illustrated in these examples, the signals that are transmitted over the legacy bus cannot be transmitted using these existing approaches unless the frequencies of the signals are separated significantly. Unlike these existing approaches, as will be discussed later herein, embodiments of the present invention enable the transmission of signals that are closer in frequency because of the signal isolation provided by utilizing different transmission modes in embodiments of the present invention. Hence, aspects of various examples disclosed herein represent significant improvements over these approaches. Before discussing various embodiments of the present invention, including systems and methods for adding an additional channel, certain legacy buses are described herein as well as the present approaches for adding the channel, upon which the examples herein significantly improve.

Figure 2:
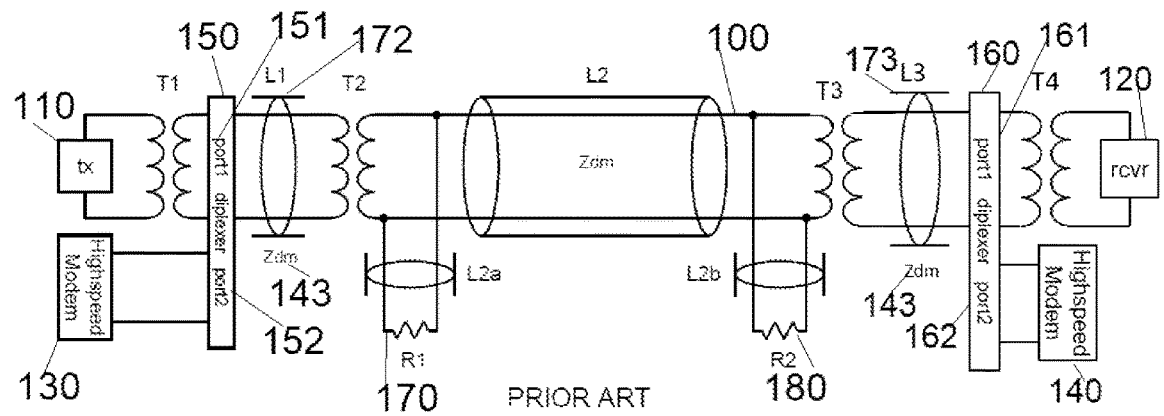
FIG. 2 depicts aspects of an existing system and method for adding an additional channel to a legacy bus.
Figure 3:
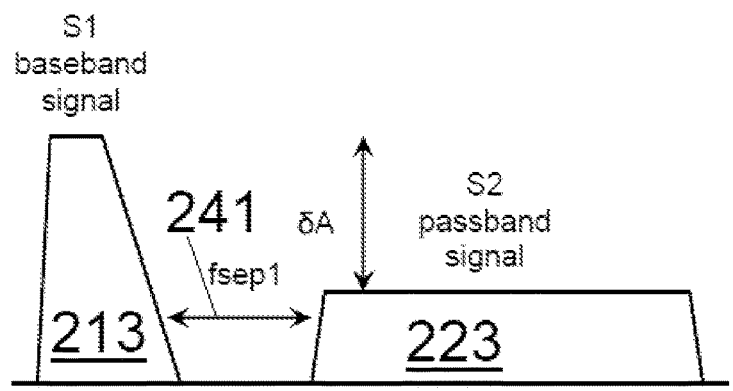
FIG. 3 depicts signals transmitted using the existing systems and methods depicted in FIG. 2.

FIG. 1 is an example of a legacy bus. FIGS. 2-3 illustrate an existing approach for adding a high-rate data channel to share the bus with a legacy baseband signal. The values and numbers offered during the discussion of these figures as well as additional figures are provided herein by way of example, only, for illustrative purposes and not to introduce any limitations.

Turning to FIG. 1, one or more legacy baseband transmitters 110 is connected to one or more legacy baseband receivers 120 via a legacy bus 100. As illustrated in FIG. 1, the transmitters 110 and receivers 120 normally incorporate line transformers, T1 and T4 respectively, to create a balanced differential signal for transmission on the bus. In this example, the transmitter 110 and receiver 120 are transformer-coupled to the bus via transformers T2 and T3, respectively. In other examples of existing technologies, the transmitter and receiver can be direct-coupled to the bus, in which case the transformers T2 and T3 would be omitted. The legacy bus 100 uses differential mode signals on unshielded twisted pair (UTP) or shielded twisted pair (STP) cables. STP cables usually have a well-defined common mode impedance (Zcm) in addition to the differential mode impedance (Zdm) 143. The legacy bus 100 is a controlled impedance bus. Isolation resistors may be utilized but are not shown, however, the legacy bus 100 does include bus terminations (resistors 170, 180 across ends of bus) which are used to mitigate signal reflections, which increase with the transmit level. In some examples, the termination resistors 170, 180 are utilized for data rates >~100 kb/s. The signal on the bus "settles" faster with proper termination. Standards for these legacy systems, many of which were developed for military uses, but later were applied in commercial settings, were developed when coding gain was either expensive or not technologically feasible. Therefore, high transmit voltages were often used to achieve the required signal-to-noise ratio (SNR) or noise tolerance.

FIG. 2 illustrates a legacy bus 100 upon which was implemented an existing approach for adding a high-rate data channel to share the bus with a legacy baseband signal. As illustrated in FIG. 2, an existing approach to adding a second, high-speed signal to the legacy bus is to add a second transmitter/receiver pair, such as a pair of modems, which are both differentially coupled to the line, and to use frequency domain multiplexing to separate the added high-speed signal from the legacy baseband signal. The example of an existing approach in FIG. 2 shows the addition of high-speed data modems 130, 140 and the use of diplexers 150, 160 to combine/separate the high-speed and legacy signals, both of which are differentially coupled (as depicted via the differential mode impedance (Zdm) at the lines L1 172, L2 100 and L3 173). In this way, a high rate (e.g., >10 M) channel is added to a network built around a lower speed (e.g., <5 M) bus.

As illustrated in FIG. 2, utilizing one or more diplexers 150, 160 to combine/separate the signals, although possible, requires a complex design to implement and is an approach with inherent limitations regarding the frequencies of the signals carried on the bus 100 (i.e., the frequencies of the signals are separated significantly). As understood by one of skill in the art, a diplexer is a passive device that implements frequency-domain multiplexing. As depicted in FIG. 2, two ports can be multiplexed onto a third port and the signals on these two ports occupy disjoint frequency bands. Thus, the signals on the two initial ports can coexist on the third port without interfering with each other, as long as they are separated sufficiently in frequency.

Returning to FIG. 2, an existing approach for carrying two signals on an existing legacy bus using one or more diplexers, the approach utilizes two modems 130, 140 and frequency domain multiplexing with a diplexer 150, 160. Specifically, a transmitter (tx) 110 and a first highspeed modem 130 transmit two signals over the legacy bus 100 to be received by a receiver (rcvr) 120 and a second highspeed modem 140. The signals are transmitted, respectively, through a first port and a second port of a diplexer 150 and are received and routed to the receiver (rcvr) 120 and the second highspeed modem 140, via a second diplexer 160, utilizing a first and second port of this diplexer 160. The diplexers 150, 160 combine the two signals in one direction and separate the signals by frequency in the other direction. Specifically, the low frequency ports 151,161 of the diplexer are used for the legacy baseband signal and the high frequency ports 152, 162 of the diplexers 150, 160 are used for the higher frequency high-speed signal. The signals themselves are illustrated in the frequency domain in FIG. 3, where the baseband legacy signal is at a higher power level due to the necessary high transmit voltages, mentioned earlier. Circuits which accomplish frequency domain separation are easier to build if the low and high frequency bands have wide frequency separations (e.g., ~10-30 MHz between band edges). This is especially true when one of the signals is at a significantly higher power level than the other signal. The diplexers 150, 160, because they are passive LC filters, (which combine inductors (L) and capacitors (C) to form low-pass, high-pass, multiplexers) work best in circuits with well defined (and modest) impedances.

FIG. 3 further illustrates an issue with existing approaches; the baseband and passband signal differ in frequency with a significant separation between them. (As will be discussed later, certain of the examples herein eliminate this requirement for the frequencies of the signals as these examples can transmit a first and second signal which are both of a low frequency.) FIG. 3 depicts the two signals, S1 the legacy baseband signal 213, that goes through the low frequency ports of diplexers 151,161 (FIGS. 2) and S2, a passband signal 223, the higher frequency signal goes through the high frequency ports of diplexers 152, 162 (FIG. 2). The signals 213, 223, a typical (high level) baseband bus signal 213 and a much smaller and broader wideband signal 223, are transmitted via the legacy bus 100 (FIG. 2) using frequency separation (fsep1 241).

Figure 4:
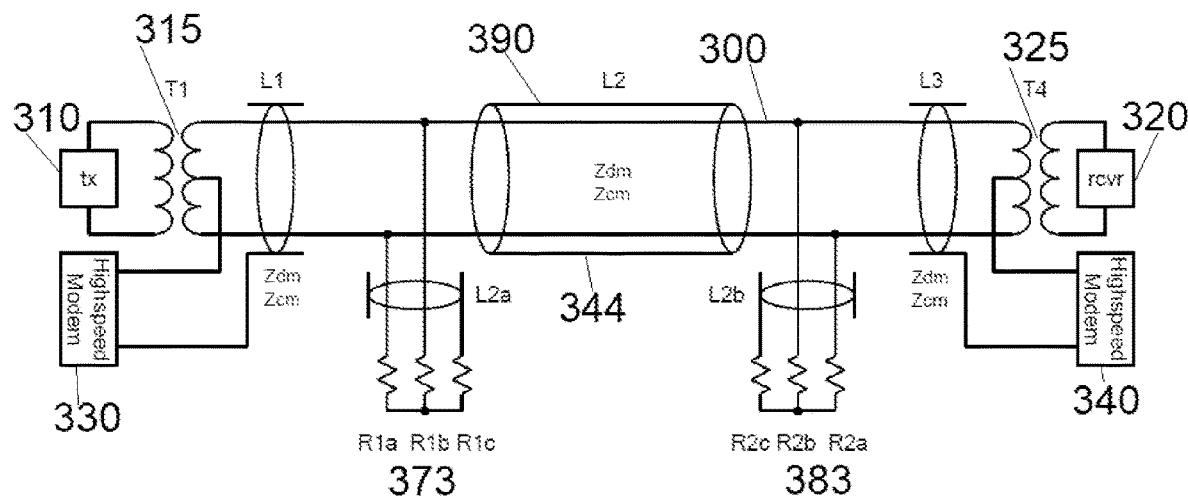
FIG. 4 depicts aspects of some embodiments of the present invention which include a system and method for adding an additional channel to a legacy bus.

Unlike the example of the existing approach illustrated in FIGS. 2-3, in some embodiments of the present invention, the large frequency separation of the signals is not a requirement. As will be explained and illustrated herein, various embodiments of the present invention couple a second transmitter to a legacy data bus in order to add a high-rate channel to a legacy baseband bus that uses transformer couplers to access the bus. As noted above, in some embodiments of the present invention, with the implementation of various aspects, a legacy bus can be utilized with a second high-speed channel by isolating the two signals using: 1) the normal differential mode for the legacy signal; and 2) common mode propagation for the additional high-speed signal. Various aspects in certain of these embodiments also circumvent the high-loss, high-pass response of the coupler with a bypass circuit. The figures that follow depict various examples of aspects of the present invention having been implemented on a legacy bus to add the high-rate channel utilizing spatial separation. While certain examples provided herein accomplish the transmission of the two signals on a legacy bus, some of the examples herein also enable the second signal (e.g., the signal being added) to be transmitted at a lower frequency, closer to the frequency of the original baseband signal, which is an additional advantage over existing approaches. FIGS. 4, 5, 7, and 9 all depict aspects of embodiments of the present invention which add transmission of a second signal to a legacy bus. In these figures, signal isolation is provided by utilizing different transmission modes. The bus 300 of FIG. 4 is slightly different than the buses 400, 600, 800 of FIGS. 5, 7, and 9 because the bus 300 of FIG. 4 does not include transformer couplers 416, 616, 816 (see, FIGS. 5-9). These transformer couplers 416, 426, 616, 626, 816, 826 present a challenge to common-mode transmission of a second signal and thus, there are differing approaches provided herein for when this structure is present in a legacy bus. As will be discussed in greater detail herein, FIG. 5 relies on parasitic coupling in the transformers for the common-mode signal to pass. The examples in FIGS. 7 and 9 employ a bypass circuit for the common-mode signal to bypass the transformer couplers. The examples in FIGS. 4, 7, and 9 enable the two signals to be closer in frequency while this advantage is not provided by the example in FIG. 5.

As noted below, the legacy bus 300 of FIG. 4 does not include transformer couplers present in later figures. Referring to FIG. 4, in this example, the common mode is accessed using the transformer center-taps at the transmitter and receiver 310, 320. The legacy baseband channel is transmitted using differential mode from the transmitter 310 to the receiver 320. As in FIG. 2, high-speed modems 330, 340 transmit a high-rate channel over the legacy bus 300. However, these high-speed signals are now transmitted using common mode. The shielded twisted pair cable of the bus often has a well-defined common mode impedance (Zcm) in addition to the differential mode impedance (Zdm). As with many embodiments of the present invention when contrasted with existing approaches, the signals can be closer in frequency (e.g., than in FIG. 3) because of the signal isolation provided by utilizing different modes.

Figure 13:
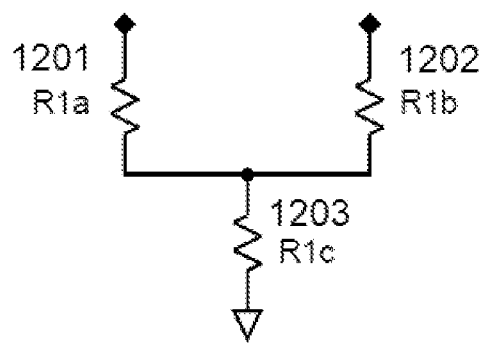
FIG. 13 depicts certain aspects of some embodiments of the present invention.
Figure 14:
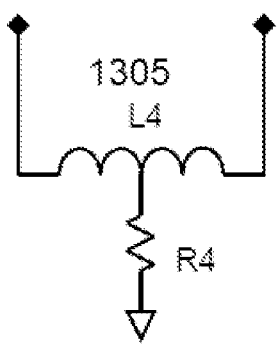
FIG. 14 depicts certain aspects of some embodiments of the present invention.

In FIG. 4, both the differential and common modes of the bus 300 are terminated (resistors R1a-R1c 373 and resistors R2a-R2c 383) to minimize unwanted reflections (R1c+R1a/2=Zcm). The terminator apparatus 373, 383 in some embodiments of the present invention includes a coupled inductor to implement the common mode termination. These inductors are utilized in embodiments of the present invention, for example, when R1a/2>Zcm. FIG. 13 is a terminator apparatus 1200 which can be implemented in some embodiments of the present invention which does not include an inductor, just resistors 1201, 1202, 1203. FIG. 14 is a terminator apparatus 1200 which can be implemented in some embodiments of the present invention which does include an inductor L4 1205.

Figure 5:
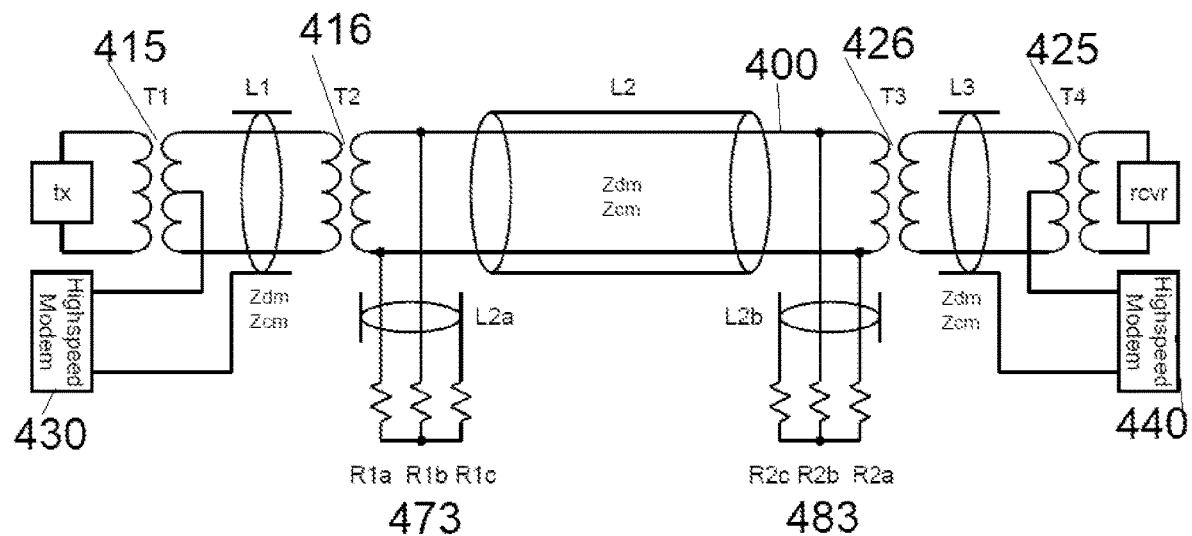
FIG. 5 depicts aspects of some embodiments of the present invention which include a system and method for adding an additional channel to a legacy bus.

Unlike FIG. 4, FIG. 5 depicts the transmission of the two signals using the common-mode approach over a legacy bus that does include transformer couplers 416, 426. The common-mode signals traverse the transformer couplers because of the transformer's parasitic inter-winding capacitance. Traversing the transformer coupler in this way exhibits a lossy, high-pass characteristic. Thus, utilizing parasitic coupling enables the transmission of signals of high frequency (around ~70 MHz) to traverse the coupler. In embodiments of the present invention that utilize parasitic coupling, the high-speed signal would need to be frequency-translated to this high frequency, at the expense of power and complexity. Another potential complexity of utilizing embodiments that utilize parasitic coupling without a bypass circuit is that the STP cable of the bus exhibits more loss at these high frequencies, further reducing the SNR of the received high-speed signals.

Figure 6:
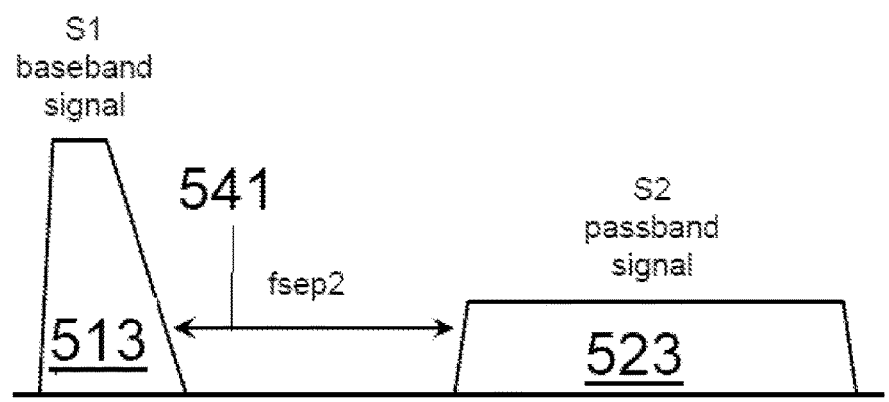
FIG. 6 depicts signals transmitted using the aspects of some embodiments illustrated herein.

FIG. 6 illustrates the resulting frequency separation 441 between the baseband signal S1 413 and the passband signal S2 423, as illustrated in FIG. 5. As with FIG. 3, there is a larger separation between the frequencies of the signals when compared to the examples that follow.

Figure 7:
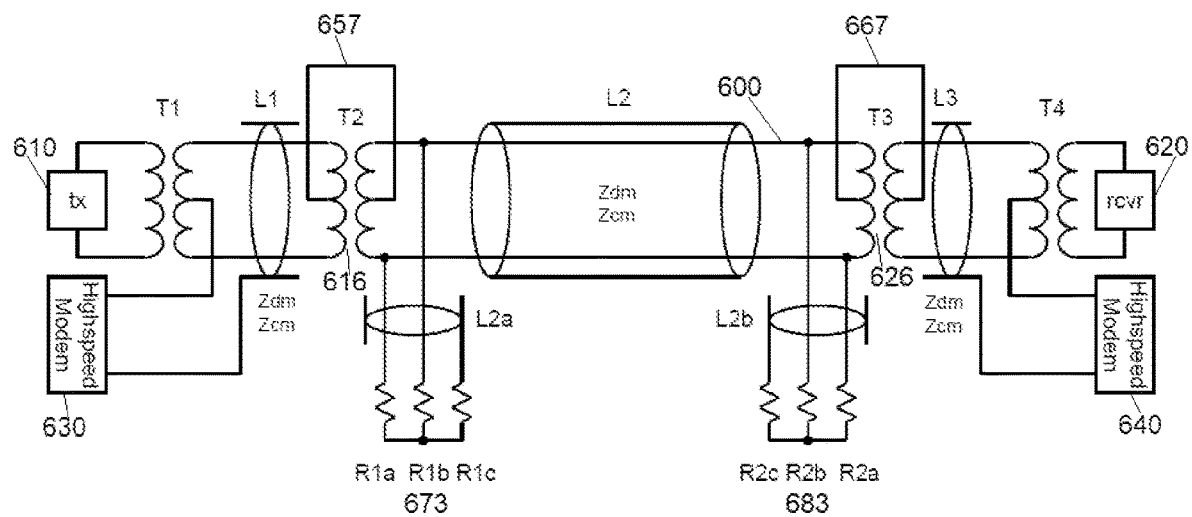
FIG. 7 depicts aspects of some embodiments of the present invention which include a system and method for adding an additional channel to a legacy bus.

The example illustrated in FIG. 7 includes both advantages of embodiments of the present invention: 1) the addition of a high-speed data signal to a legacy bus using common mode; and 2) the ability to transmit the added high-speed signal at a frequency just above that of the baseband legacy signal. As noted above, turning to FIG. 7, in some examples of embodiments of the present invention, the couplers (e.g., transformers T2 616 and T3 626) are bypassed in the common-mode sense. In FIG. 7, the high-rate channel is transmitted over a legacy bus 600, and signals of a lower frequency, as low as ~5 MHz, in one non-limiting example, can be transmitted and received. Rather than relying on parasitic coupling, in this example, wires 657, 667 connect the transformer center taps. With this bypass (wires 657, 667), frequency translation is not needed, as the bypass provides a low-frequency, low-loss path for the common mode signal to pass the transformer coupler. Circumvention of a high pass response of a coupler (e.g., transformers T2 616 and T3 626) via the bypass wire 657, 667 alleviates costly frequency conversion of the signal. Examples that utilize a bypass, of which the bypass in FIG. 7 is just one example, include both aspects discussed above: 1) spatial separation or common mode propagation; and 2) alleviating frequency conversion.

Figure 8:
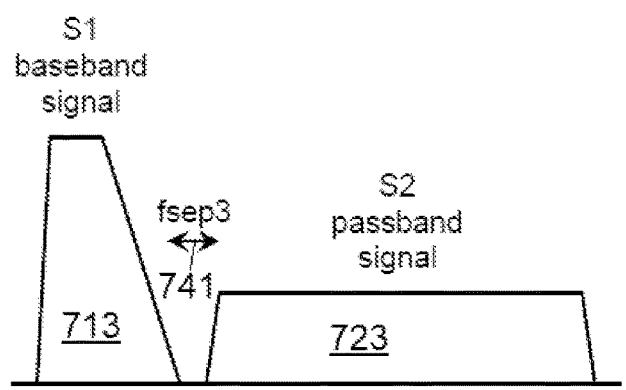
FIG. 8 depicts signals transmitted using the aspects of some embodiments illustrated herein.

Referring to FIG. 7, in this example, both the differential and common modes of the bus 600 are terminated (resistors R1a-R1c 673 and resistors R2a-R2c 683) to minimize unwanted reflections. FIG. 8 illustrates examples of signals S1 713 (baseband) and S2 723 (passband) carried on bus 600 utilizing aspects of the example in FIG. 7. The passband high-rate data signal S2 723, can be transmitted at a lower frequency because of the isolation between differential mode and common mode and because it bypasses the transformers 616, 626 (FIG. 7). The reduced frequency separation between the baseband and passband signals is illustrated in FIG. 8 by the separation (fsep3) 741 between the signals, which is smaller than the previous separations fsep1 241 (FIG. 3) and fsep2 541 (FIG. 6). As discussed above, a significant advantage of certain embodiments of the invention is that the added high-rate data signal can be transmitted at a significantly lower frequency than the existing methods, resulting in lower signal loss and thereby lower receiver complexity.

The baseband signal, S1 713 (FIG. 8) is passed from the transmitter 610 (FIG. 7) to the receiver 620 (FIG. 7) while the passband signal S2 723 (FIG. 8) (representing the added channel) is passed between the high-speed modems 630, 640 (FIG. 7). As illustrated herein, the band edge locations are not very critical since they primarily determine noise bandwidth and not channel separation. As in FIGS. 4 and 5, in certain examples of the illustrated embodiment, the terminator apparatus 673, 683 includes a coupled inductor to implement the common mode termination.

Figure 9:
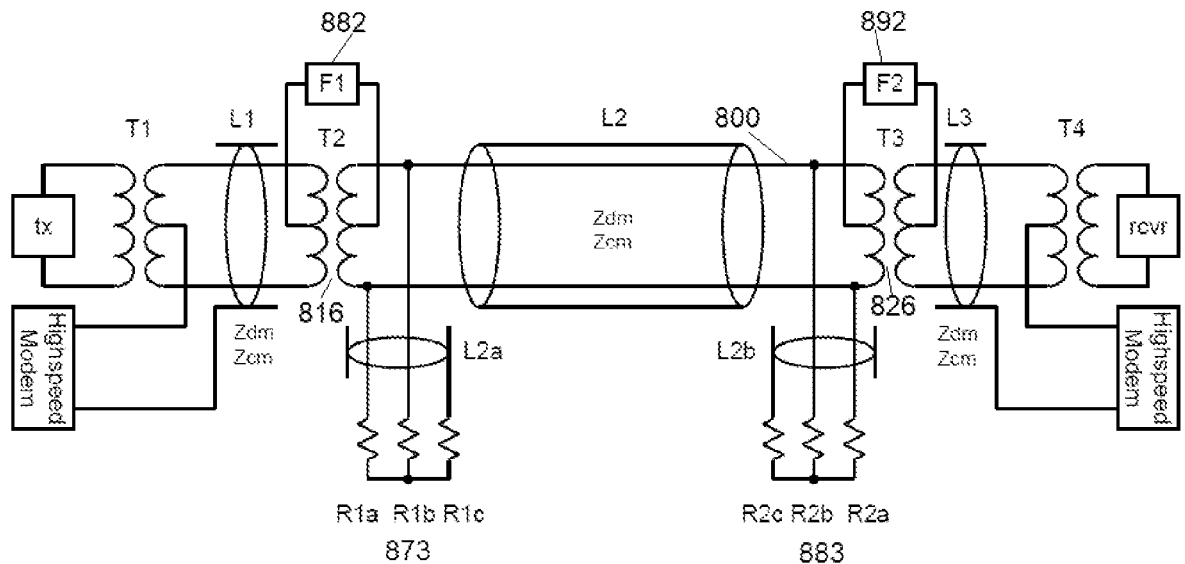
FIG. 9 depicts aspects of some embodiments of the present invention which include a system and method for adding an additional channel to a legacy bus.
Figure 15:
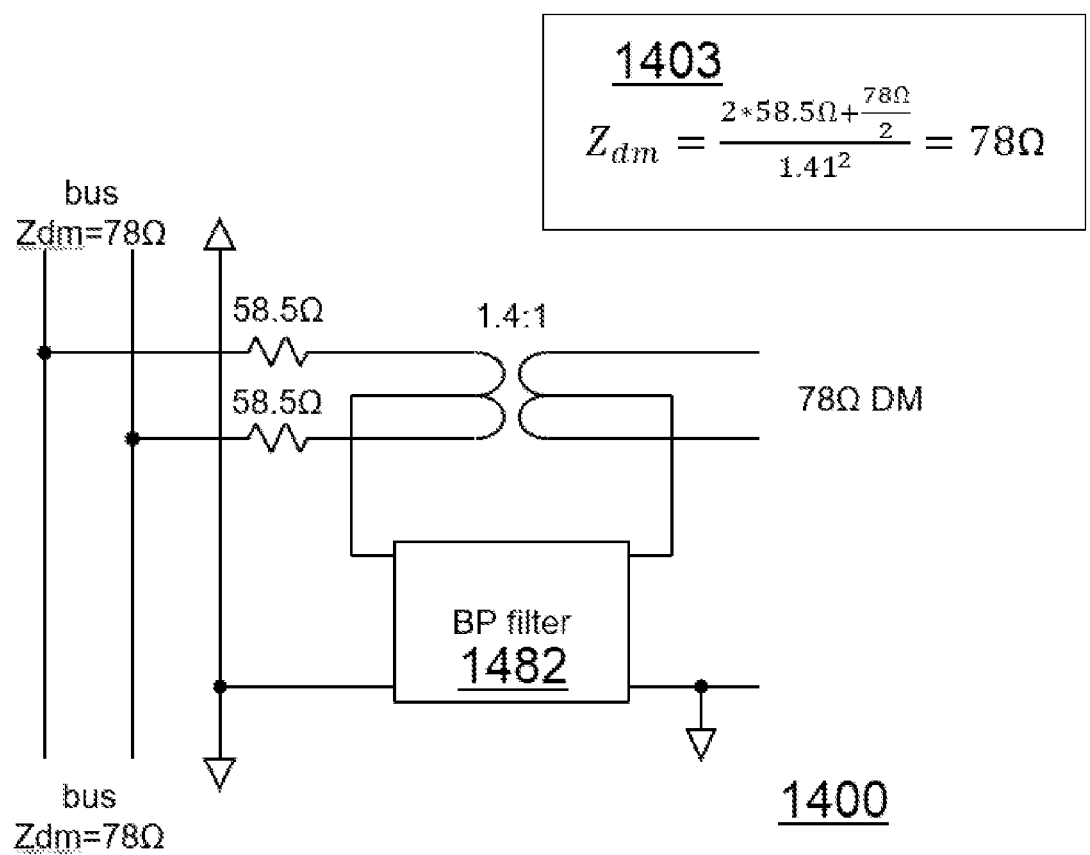
FIG. 15 depicts certain aspects of some embodiments of the present invention.

In FIG. 9, as in FIG. 7, the example illustrated includes both advantages of embodiments of the present invention: 1) the addition of a high-speed common-mode data signal to a legacy bus; and 2) the ability to transmit the added high-speed signal at a frequency just above that of the baseband legacy signal. In FIG. 9, the couplers 816, 826 are bypassed using filters 882, 892, which serve to isolate the baseband and passband signals further. Filters utilized in embodiments of the present invention may be simpler than the diplexer utilized in existing methods as embodiments of the present invention utilize spatial separation as well to separate the signals. Hence, a bandpass filter is an example of a filter that can be utilized in embodiments of the present invention. An example of a coupler with a filter that can be utilized in certain embodiments of the present invention is illustrated in FIG. 15. Returning to FIG. 9, as in FIGS. 4, 5, and 7, in certain examples of the illustrated embodiment, the terminator apparatus 873, 883 can include a coupled inductor to implement the common mode termination.

Figure 12:
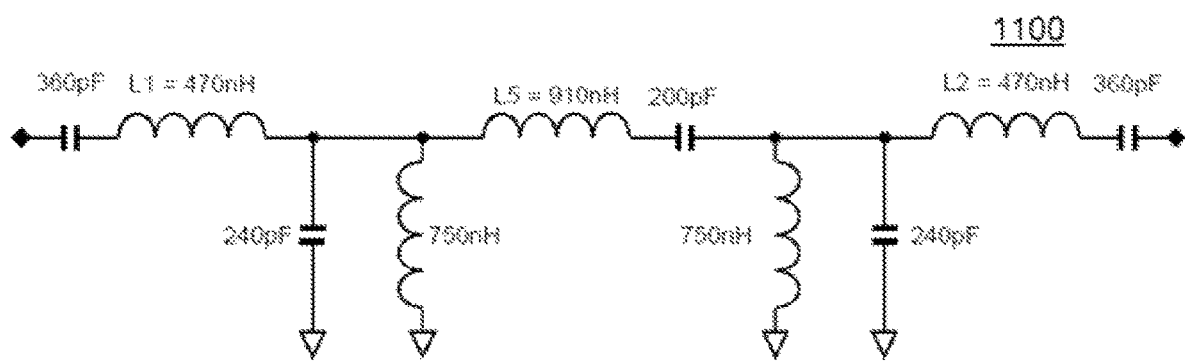
FIG. 12 depicts certain aspects of some embodiments of the present invention.

FIG. 12 is a non-limiting example of a filter 1100 that can be utilized in certain embodiments of the present invention, including in FIG. 9. Specifically, the illustrated filter 1100 of FIG. 12 is a ~6-~24 MHz ($5^{th}$ order) bandpass filter. This filter 1100 can be utilized to bypass the high-speed common mode signals around a coupler, including but not limited to a MIL-STD-1553 coupler.

Figure 10:
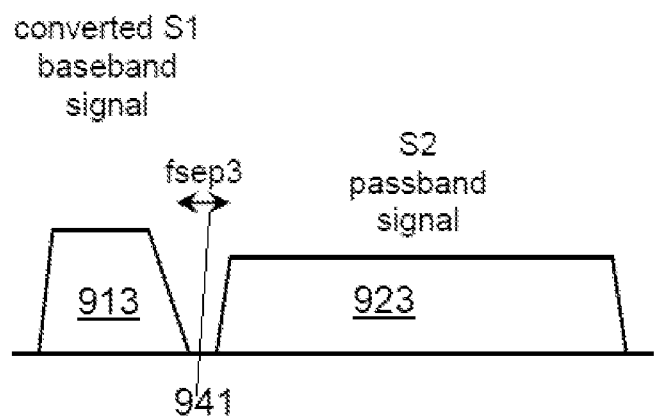
FIG. 10 depicts signals transmitted using the aspects of some embodiments illustrated herein.
Figure 11:
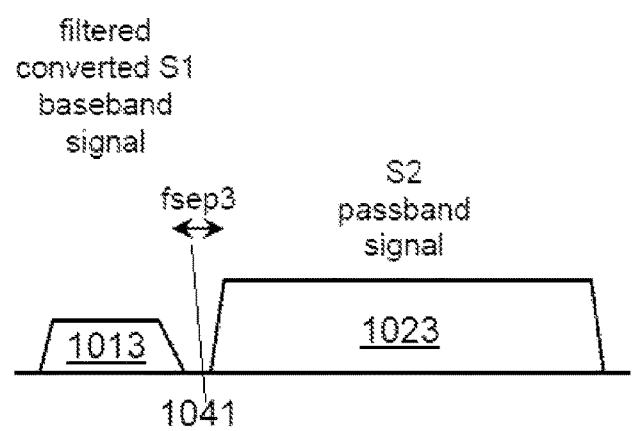
FIG. 11 depicts signals transmitted using the aspects of some embodiments illustrated herein.

Returning to FIG. 9, using the filters 882, 892 assists in reducing interference between the signal which the bus 800 was designed to carry, and the new signal, the capability to carry this signal being added in embodiments of the present invention. Because each filter 882, 892 only allows certain frequencies through, the two signals can be closer together in frequency. Interference may be caused, in part, in the absence of a filter 882, 892, because some of the baseband signal is converted from differential to common mode by non-linearities or imbalances in the cable and/or circuits in the examples (and reverse for common-mode contamination of the differential baseband signal), which is illustrated in FIGS. 10-11.

Returning to FIG. 9, utilizing the filters 882, 892 can reduce leakage between the common mode and the differential mode. FIGS. 10-11 illustrate how the use of a coupler bypass that includes a filter 882, 892 (FIG. 9) decreases leakage between modes by filtering the converted baseband signal. As aforementioned, some of the baseband signal is converted from differential to common mode. The baseband signal 913 in FIG. 10 represents that portion of the baseband signal that has been converted to common mode, depicting its lower power level. This converted baseband signal could interfere with the high-rate data signal. FIG. 11 shows the converted baseband signal after filtering by the bypass filters 882 and 892 of FIG. 9, illustrating the reduced signal power relative to FIG. 10. The use of the bypass filters reduces the possibility of interference with the high-rate data signal.

As discussed earlier, an advantage of utilizing embodiments of the present invention to add a second signal for transmission over a legacy bus is that in embodiments of the present invention, the two signals (the original and the added signal) can be closer in frequency than in existing approaches because of the signal isolation provided by utilizing different modes. This advantage is particularly visible in FIG. 10-11.

FIG. 15 depicts a non-limiting example of a technical architecture for a common-mode coupler 1400 that can be utilized in various embodiments of the present invention, in this case, for a MIL-STD-1553 bus. Like the couplers with filters 882, 892 illustrated in FIG. 9, the coupler 1400 of FIG. 15 includes a filter, in this example, specifically, a bandpass filter 1482. In addition, this coupler contains 58.5 ohm isolation resistors and proper transformer turns ratio for proper impedance loading of the legacy transmitter. Also included in FIG. 15 is a calculation 1403 of the differential mode impedance (Zdm) seen by the legacy transmitter in this example.

Embodiments of the present invention include system, methods, and computer program products, for transmitting a high-rate data signal over a legacy bus. In some examples, the system includes a bus communicatively coupled to a transmitter and a receiver via one or more transformer couplers, wherein the transmitter and receiver transmit and receive a first signal, wherein the first signal is transmitted over the bus utilizing a differential mode. The system can also include at least two modems, wherein a first modem of the at least two modems is coupled to a first location on the bus and wherein a second modem of the at least two modems is coupled to a second location on the bus, wherein the first modem transmits a second signal over the bus for receipt by the second modem, wherein the at least two modems are coupled to the bus via the one or more transformer couplers, wherein the second signal is transmitted over the bus utilizing a common mode, and wherein the first signal and the second signal are spatially separated on the bus based on an isolation between the common mode and the differential mode. The method can include: spatially separating a first signal from a second signal for transmission over a bus, the spatially separating comprising: utilizing a transmitter and receiver pair to transmit a first signal over a bus in a differential mode, wherein the bus is communicatively coupled to the transmitter and to the receiver via one or more transformer couplers; and utilizing at least two modems to transmit a second signal over the bus in a common mode, wherein the bus is communicatively coupled to the one or more modems via the one or more transformer couplers. The computer program product can include a computer readable storage medium readable by one or more processors and storing instructions for execution by the one or more processors for performing a method comprising: spatially separating, by the one or more processors, a first signal from a second signal for transmission over a bus, the spatially separating comprising: utilizing a transmitter and receiver pair to transmit a first signal over a bus in a differential mode, wherein the bus is communicatively coupled to the transmitter and to the receiver via one or more transformer couplers; and utilizing at least two modems to transmit a second signal over the bus in a common mode, wherein the bus is communicatively coupled to the one or more modems via the one or more transformer couplers.

In some examples, the transmitter and the receiver are communicatively coupled to the bus either directly or via transformer coupler, and wherein the at least two modems are coupled to the bus either directly or via transformer couplers.

In some examples, the first signal is a baseband signal and the second signal is a passband signal.

In some examples, the second signal passes to and from the bus utilizing parasitic coupling in transformers comprising the one or more transformer couplers.

In some examples, a portion of the one or more transformer couplers each further comprise a bypass circuit, wherein the second signal passes to and from the bus utilizing the bypass circuit.

In some examples, each bypass circuit comprises a filter. The filter can be a bandpass filter.

In some examples, the bus further includes a first terminator connected to one end of the bus and a second terminator connected to the other end of the bus, wherein the terminators minimize reflections of the first signal and the second signal. The first terminator and the second terminator can each comprise at least three resistors. The first terminator and the second terminator can each comprise at least two resistors coupled via at least one inductor.

In some examples, the bus is a MIL-STD-1553 bus.

In some examples, the first signal is of a higher voltage than the second signal.

In some examples, the separation between the common mode and the differential mode is based on an orthogonality between the common mode and the differential mode.

Figure 16:
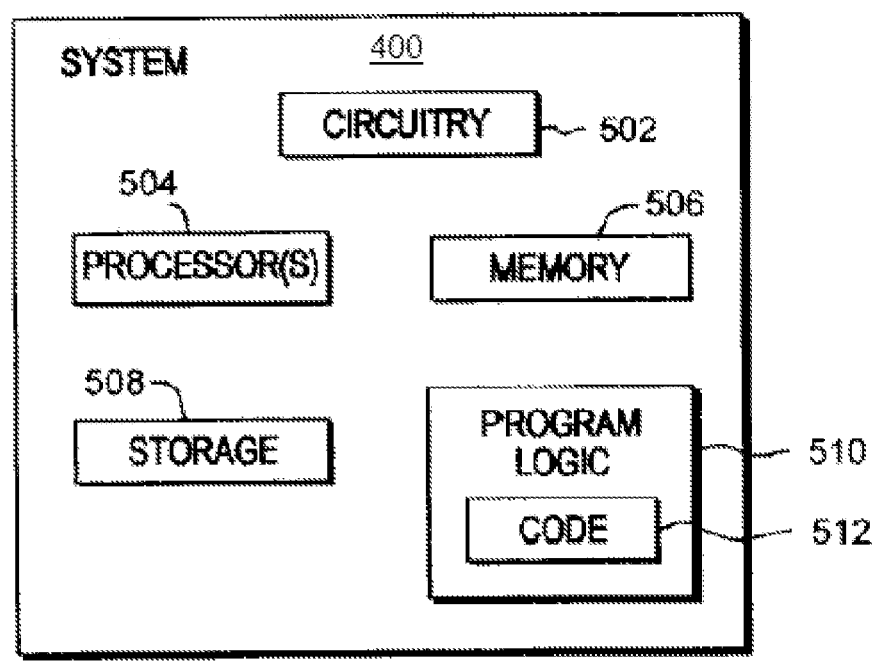
FIG. 16 depicts a computer system configured to perform an aspect of an embodiment of the present invention.

In some examples, the second modem transmits the second signal over the bus for receipt by the first modem, FIG. 16 illustrates a block diagram of a resource 400 in computer system, such as, which is part of the technical architecture of certain embodiments of the technique. For example, a resource 400 could be connected to or included in the modems utilized in various embodiments of the present invention to send and receive the additional signal over the legacy bus. Additionally, certain buses that can be utilized in embodiments of the present invention are themselves computing resources 400. Returning to FIG. 16, the resource 400 may include a circuitry 502 that may in certain embodiments include a microprocessor 504. The computer system 400 may also include a memory 506 (e.g., a volatile memory device), and storage 508. The storage 508 may include a non-volatile memory device (e.g., EEPROM, ROM, PROM, RAM, DRAM, SRAM, flash, firmware, programmable logic, etc.), magnetic disk drive, optical disk drive, tape drive, etc. The storage 508 may comprise an internal storage device, an attached storage device and/or a network accessible storage device. The system 400 may include a program logic 510 including code 512 that may be loaded into the memory 506 and executed by the microprocessor 504 or circuitry 502.

In certain embodiments, the program logic 510 including code 512 may be stored in the storage 508, or memory 506. In certain other embodiments, the program logic 510 may be implemented in the circuitry 502. Therefore, while FIG. 7 shows the program logic 510 separately from the other elements, the program logic 510 may be implemented in the memory 506 and/or the circuitry 502. The program logic 510 may include the program code discussed in this disclosure that facilitates the reconfiguration of elements of various computer networks, including those in various figures.

Figure 17:
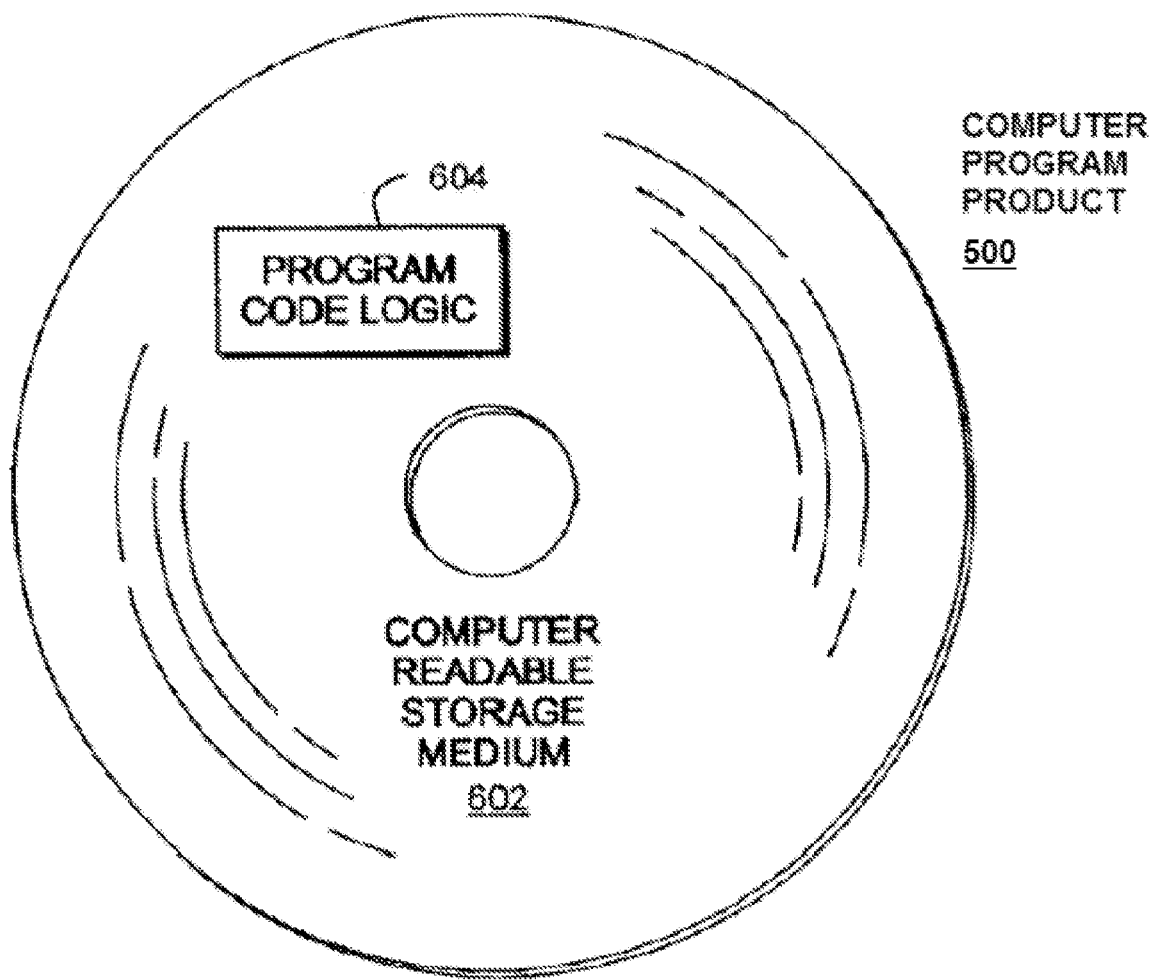
FIG. 17 depicts a computer program product incorporating one or more aspects of the present invention.

Using the processing resources of a resource 400 to execute software, computer-readable code or instructions, does not limit where this code can be stored. Referring to FIG. 17, in one example, a computer program product 500 includes, for instance, one or more non-transitory computer readable storage media 602 to store computer readable program code means or logic 604 thereon to provide and facilitate one or more aspects of the technique.

As will be appreciated by one skilled in the art, aspects of the technique may be embodied as a system, method or computer program product. Accordingly, aspects of the technique may take the form of an entirely hardware embodiment, an entirely software embodiment (including firmware, resident software, micro-code, etc.) or an embodiment combining software and hardware aspects that may all generally be referred to herein as a "circuit," "module" or "system". Furthermore, aspects of the technique may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable signal medium may include a propagated data signal with computer readable program code embodied therein, for example, in baseband or as part of a carrier wave. Such a propagated signal may take any of a variety of forms, including, but not limited to, electro-magnetic, optical or any suitable combination thereof. A computer readable signal medium may be any computer readable medium that is not a computer readable storage medium and that can communicate, propagate, or transport a program for use by or in connection with an instruction execution system, apparatus, or device.

A computer readable storage medium may be, for example, but not limited to, an electronic, magnetic, optical, electromagnetic, infrared or semiconductor system, apparatus, or device, or any suitable combination of the foregoing. More specific examples (a non-exhaustive list) of the computer readable storage medium include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

Any combination of one or more computer readable medium(s) may be utilized. The computer readable medium may be a computer readable signal medium or a computer readable storage medium. A computer readable signal medium may include a propagated data signal with computer readable program code embodied therein, for example, in baseband or as part of a carrier wave. Such a propagated signal may take any of a variety of forms, including, but not limited to, electro-magnetic, optical or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using an appropriate medium, including but not limited to wireless, wireline, optical fiber cable, RF, etc., or any suitable combination of the foregoing.

Computer program code for carrying out operations for aspects of the technique may be written in any combination of one or more programming languages, including an object oriented programming language, such as Java, Smalltalk, C++ or the like, and conventional procedural programming languages, such as the "C" programming language, PHP, ASP, assembler or similar programming languages, as well as functional programming languages and languages for technical computing (e.g., Python, Matlab). The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). Furthermore, more than one computer can be used for implementing the program code, including, but not limited to, one or more resources in a cloud computing environment.

Aspects of the technique are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions, also referred to as software and/or program code, may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the technique. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

In addition to the above, one or more aspects of the technique may be provided, offered, deployed, managed, serviced, etc. by a service provider who offers management of customer environments. For instance, the service provider can create, maintain, support, etc. computer code and/or a computer infrastructure that performs one or more aspects of the technique for one or more customers. In return, the service provider may receive payment from the customer under a subscription and/or fee agreement, as examples. Additionally or alternatively, the service provider may receive payment from the sale of advertising content to one or more third parties.

In one aspect of the technique, an application may be deployed for performing one or more aspects of the technique. As one example, the deploying of an application comprises providing computer infrastructure operable to perform one or more aspects of the technique.

As a further aspect of the technique, a computing infrastructure may be deployed comprising integrating computer readable code into a computing system, in which the code in combination with the computing system is capable of performing one or more aspects of the technique.

As yet a further aspect of the technique, a process for integrating computing infrastructure comprising integrating computer readable code into a computer system may be provided. The computer system comprises a computer readable medium, in which the computer medium comprises one or more aspects of the technique. The code in combination with the computer system is capable of performing one or more aspects of the technique.

Further, other types of computing environments can benefit from one or more aspects of the technique. As an example, an environment may include an emulator (e.g., software or other emulation mechanisms), in which a particular architecture (including, for instance, instruction execution, architected functions, such as address translation, and architected registers) or a subset thereof is emulated (e.g., on a native computer system having a processor and memory). In such an environment, one or more emulation functions of the emulator can implement one or more aspects of the technique, even though a computer executing the emulator may have a different architecture than the capabilities being emulated. As one example, in emulation mode, the specific instruction or operation being emulated is decoded, and an appropriate emulation function is built to implement the individual instruction or operation.

In an emulation environment, a host computer includes, for instance, a memory to store instructions and data; an instruction fetch unit to fetch instructions from memory and to optionally, provide local buffering for the fetched instruction; an instruction decode unit to receive the fetched instructions and to determine the type of instructions that have been fetched; and an instruction execution unit to execute the instructions. Execution may include loading data into a register from memory; storing data back to memory from a register; or performing some type of arithmetic or logical operation, as determined by the decode unit. In one example, each unit is implemented in software. For instance, the operations being performed by the units are implemented as one or more subroutines within emulator software.

Further, a data processing system suitable for storing and/or executing program code is usable that includes at least one processor coupled directly or indirectly to memory elements through a system bus. The memory elements include, for instance, local memory employed during actual execution of the program code, bulk storage, and cache memory which provide temporary storage of at least some program code in order to reduce the number of times code must be retrieved from bulk storage during execution.

Input/Output or I/O devices (including, but not limited to, keyboards, displays, pointing devices, DASD, tape, CDs, DVDs, thumb drives and other memory media, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems, and Ethernet cards are just a few of the available types of network adapters.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components and/or groups thereof.

The corresponding structures, materials, acts, and equivalents of all means or steps plus function elements in the descriptions below, if any, are intended to include any structure, material, or act for performing the function in combination with other elements as specifically noted. The description of the technique has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular uses contemplated.

The invention claimed is:

1. A system comprising:
a legacy bus communicatively coupled to a transmitter and a receiver via one or more transformer couplers, wherein the transmitter and receiver transmit and receive a first signal, wherein the first signal is a legacy baseband signal transmitted over the legacy bus utilizing a differential mode; and
at least two modems, wherein a first modem of the at least two modems is coupled to a first location on the legacy bus and wherein a second modem of the at least two modems is coupled to a second location on the bus, wherein the first modem transmits a second signal over the legacy bus for receipt by the second modem, wherein the second signal is a high-rate data signal, wherein the at least two modems are coupled to the legacy bus via the one or more transformer couplers, wherein the second signal is transmitted over the legacy bus utilizing a common mode, and wherein the first signal and the second signal are spatially separated on the legacy bus during transmission over the legacy bus based on an isolation between the common mode and the differential mode, wherein the separation between the common mode and the differential mode when the first signal and the second signal are transmitted over the legacy bus is based on an orthogonality between the common mode and the differential mode, wherein the first signal and the second signal are low frequency signals.

2. The system of claim 1, wherein the legacy bus is communicatively coupled to the transmitter and the receiver either directly or indirectly, and wherein the at least two modems are coupled to the legacy bus either directly or indirectly.

3. The system of claim 1, wherein the first signal is a baseband signal and the second signal is a passband signal.

4. The system of claim 1, wherein the second signal passes to and from the legacy bus utilizing parasitic coupling in transformers comprising the one or more transformer couplers.

5. The system of claim 1, wherein a portion of the one or more transformer couplers each further comprise a bypass circuit, wherein the second signal passes to and from the legacy bus utilizing the bypass circuit.

6. The system of claim 1, wherein each bypass circuit comprises a filter.

7. The system of claim 6, wherein the filter is a bandpass filter.

8. The system of claim 1, the legacy bus further comprising a first terminator proximate to the first end of the legacy bus and a second terminator proximate to the second end of the bus, wherein the terminators minimize reflections of the first signal and the second signal.

9. The system of claim 8, wherein the first terminator and the second terminator each comprise at least three resistors.

10. The system of claim 8, wherein the first terminator and the second terminator each comprise at least two resistors coupled via at least one inductor.

11. The system of claim 1, wherein the legacy bus is a MTh-STD-1553 bus.

12. The system of claim 6, wherein the first signal is of a higher voltage than the second signal.

13. The system of claim 1, wherein the second modem transmits the second signal over the legacy bus for receipt by the first modem.

14. A method comprising:
spatially separating a first signal from a second signal for transmission over a bus, the spatially separating comprising:
utilizing a transmitter and receiver pair to transmit a first signal over a legacy bus in a differential mode, wherein the first signal is a legacy baseband signal, wherein the legacy bus is communicatively coupled to the transmitter and to the receiver via one or more transformer couplers, wherein the second signal is a high-rate data signal; and
utilizing at least two modems to transmit a second signal over the legacy bus in a common mode, wherein the legacy bus is communicatively coupled to the one or more modems via the one or more transformer couplers.

15. The method of claim 14, wherein the first signal is a baseband signal and the second signal is a passband signal.

16. The method of claim 14, further comprising:
filtering the at least one signal of the first signal and the second signal in advance of carrying the at least one signal over the bus.

17. The method of claim 14, further comprising:
minimizing, by one or more terminators, reflections of the first signal and the second signal, wherein the one or more terminators are coupled to the bus.

18. The method of claim 14, wherein the terminators comprise either at least three resistors or at least two resistors coupled with an inductor.

19. A computer program product comprising:
a non-transitory computer readable storage medium readable by one or more processors and storing instructions for execution by the one or more processors for performing a method comprising:
spatially separating, by the one or more processors, a first signal from a second signal for transmission over a bus, the spatially separating comprising:
utilizing a transmitter and receiver pair to transmit a first signal over a legacy bus in a differential mode, wherein the first signal is a legacy baseband signal, wherein the legacy bus is communicatively coupled to the transmitter and to the receiver via one or more transformer couplers; and
simultaneously with transmitting the first signal over the bus, utilizing at least two modems to transmit a second signal over the legacy bus in a common mode, wherein the second signal is a high-rate data signal, wherein the legacy bus is communicatively coupled to the one or more modems via the one or more transformer couplers.

20. The system of claim 1, wherein the first signal and the second signal are low frequency signals.

* * * * *

UNITED STATES PATENT AND TRADEMARK OFFICE
CERTIFICATE OF CORRECTION

PATENT NO. : 11,880,320 B1
APPLICATION NO. : 17/351890
DATED : January 23, 2024
INVENTOR(S) : Dixon et al.

Page 1 of 1

It is certified that error appears in the above-identified patent and that said Letters Patent is hereby corrected as shown below:

In the Claims

Column 16, Line 14: Claim 11, Delete "MTh-STD-1553 bus." and insert -- MIL-STD-1553 bus. --

Signed and Sealed this
Twenty-seventh Day of August, 2024

Katherine Kelly Vidal
*Director of the United States Patent and Trademark Office*